United States Patent [19]

Erb

[11] 4,235,075
[45] Nov. 25, 1980

[54] METHOD AND APPARATUS FOR CONVERTING RELATIVELY LOW TEMPERATURE HEAT ENERGY INTO USEFUL WORK

[76] Inventor: George H. Erb, Rte. 103, Cuttingsville, Vt. 05738

[21] Appl. No.: 871,509

[22] Filed: Jan. 23, 1978

[51] Int. Cl.³ .............................................. F03G 7/06
[52] U.S. Cl. ...................................... 60/527; 60/325; 417/379
[58] Field of Search .................. 60/325, 527, 528; 417/321, 379, 395

[56] References Cited

U.S. PATENT DOCUMENTS

| | | | |
|---|---|---|---|
| 3,068,476 | 1/1978 | Kelsey | 417/379 X |
| 3,765,799 | 10/1973 | Ledner | 417/379 X |
| 3,953,973 | 5/1976 | Cheng et al. | 60/527 X |
| 3,987,630 | 10/1976 | Hein et al. | 60/527 |
| 3,989,417 | 11/1976 | Neidigh | 417/379 |
| 3,994,132 | 11/1976 | Jackson | 417/379 X |

*Primary Examiner*—Allen M. Ostrager
*Assistant Examiner*—Stephen F. Husar
*Attorney, Agent, or Firm*—Parmelee, Johnson, Bollinger & Bramblett

[57] ABSTRACT

Method and apparatus are described for converting relatively low temperature heat energy, for example, up to approximately 212° F., into useful work. A heated zone having a temperature range including a first predetermined temperature and a cooled zone having a second temperature range including a second predetermined temperature are provided. A meltable wax material whose melting and resolidification occur within a preselected temperature range positioned along the thermal gradient between said first and second temperatures is alternately placed in heat exchange relationship with said heated and cooled zones for producing cyclic melting and resolidification of said wax material. The wax material may be separated into multiple discrete units for increasing its surface-to-volume ratio for augmenting the rate of heat flow into and out of the material during its melting and resolidification. The resultant relatively large cyclic expansion of the wax material within a relatively non-compressible liquid confined in a rigid container, produces cycles of relatively high pressure which are then used to perform useful mechanical work or are used for conversion into an energy form suitable for long term storage and which can later be used to produce useful work.

54 Claims, 6 Drawing Figures

METHOD AND APPARATUS FOR CONVERTING RELATIVELY LOW TEMPERATURE HEAT ENERGY INTO USEFUL WORK

BACKGROUND OF THE INVENTION

In industrialized countries, such as in the United States, there are vast quantities of low-temperature heat energy which are dissipated uselessly into the environment. This low-temperature heat energy is contained in gases, liquids, and solids, which are discharged from industrial plants at temperature levels currently considered to be too low for the heat energy therein to be economically utilized.

Also, throughout many geographic areas of the world, a radiation absorbent heat exchanger such as one having a dull black surface and which is insulated against heat loss, can be heated to temperatures of 250° F. or more by solar radiation. Although such solar radiation-heated heat exchangers are currently being utilized for purposes of heating buildings, houses and other inhabited spaces, they are not currently used very much for recovery of solar energy in a form suitable for performing useful mechanical work, for example such as to generate electrical power or to drive machinery or for conversion into an energy form suitable for long term storage. Thus, much of the incident solar energy in the world is currently allowed to become dissipated to the environment as waste heat energy.

The present invention provides method and apparatus for converting into useful mechanical work such low-temperature industrial and solar heat energy and other waste heat energy which is now being dissipated to ambient.

SUMMARY OF THE INVENTION

As used herein, the term "low-temperature heat energy source" is intended to mean a source of heat energy at a temperature which is so low that it is currently considered to be too low to be economically utilized, for example up to approximately 212° F. The term "waste heat energy" is intended to mean any collectible source of heat energy which is currently permitted to become dissipated to ambient because it is considered uneconomical for recovery.

A method and apparatus are described for converting into useful mechanical work low-temperature industrial and solar heat energy and other waste heat energy previously dissipated to ambient. This heat energy is used for cyclically heating and expanding thermally expandable meltable wax material having a large thermal coefficient of expansion. This wax material is alternately placed in heat exchange relationship with heated and cooled zones for producing cyclic melting and resolidification of said wax material, thus creating cycles of pressure within the liquid surrounding the wax material. The heated zone has a first temperature range including a first predetermined temperature, and the cooled zone has a second temperature range including a second predetermined temperature.

In order to maximize the thermal expansion of the meltable wax material, it is preselected to have its melting occur at a position along the thermal gradient between said first and second predetermined temperatures. For augmenting the rate of heat flow into and out of said wax material for producing its rapid expansion and contraction, it is separated into multiple units having a relatively large surface-to-volume ratio. The resultant relatively large cyclic changes in volume of the expandable wax material as it is thermally traversed back and forth through its melting/resolidification range is employed to produce cycles of liquid pressure which can then be used for performing useful mechanical work output.

BRIEF DESCRIPTION OF THE DRAWINGS

The various features, aspects and advantages of the method and apparatus of the present invention will be more fully understood from a consideration of the accompanying drawings, in conjunction with the following detailed description.

In these drawings.

DETAILED DESCRIPTION

Figure 1:
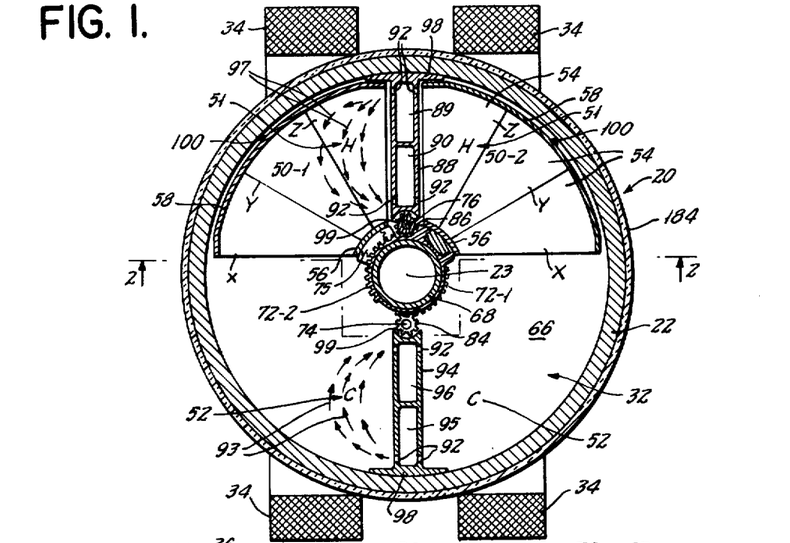
FIG. 1 is a cross-sectional view of the apparatus embodying the invention, being a section taken along the line 1—1 in FIG. 2.
Figure 2:
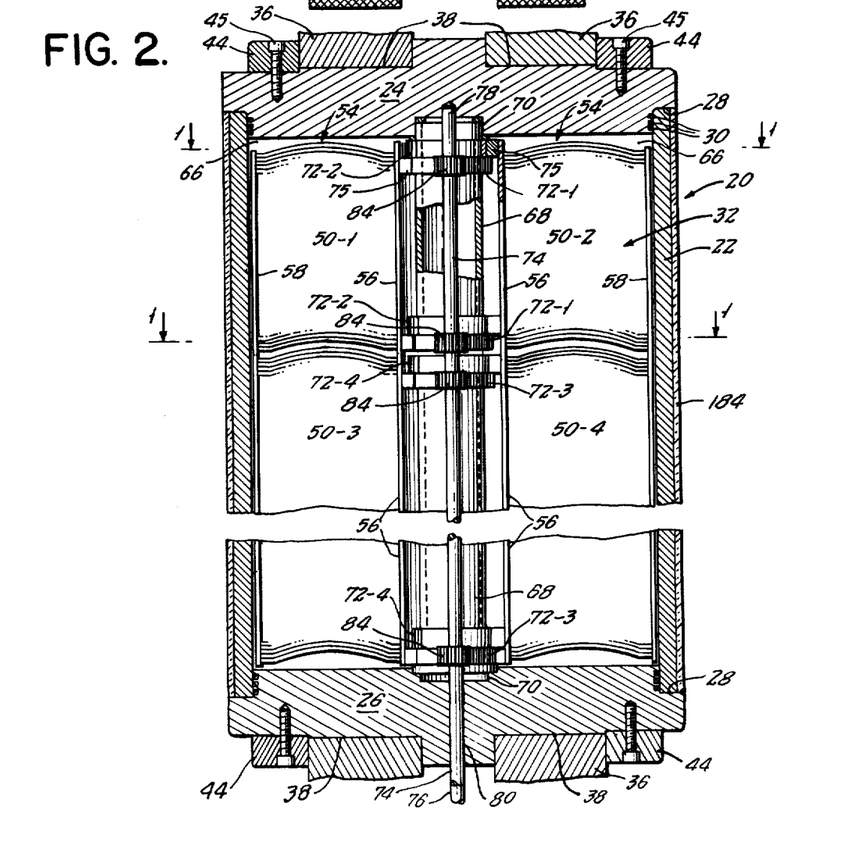
FIG. 2 is a longitudinal sectional view of the apparatus taken along the line 2—2 in FIG. 1.

As shown in FIGS. 1 and 2, there is an embodiment of this invention including a rigid container 20 having a generally cylindrical configuration. This rigid container 20 includes a cylindrical casing 22 assembled with upper and lower end caps 24 and 26. These end caps have shoulders 28 which abut against the ends of the casing 22, and a plurality of O-rings 30 serve as seal means for providing a pressure-tight interior region 32 within the container 20.

The container 20 is constructed to be rigid for resisting expansion when the pressure within the interior region 32 rises to relatively high values, for example in the range of 2,000 to 4,000 pounds per square inch (PSI), or more. For resisting expansion from internal pressure, the cylindrical casing 22 is preferably constructed of high tensile strength filaments or fibers wound or laid tightly concentrically about the cylindrical axis 23 (FIG. 1) and bonded together by suitable adherent material, such as epoxy plastic. In other words, the casing 22 is constructed to be very rigid in resisting hoop stress.

The filaments or fibers which are used to wind the casing 22 may be any suitable high-tensile strength filament elements, for example such as high strength steel music wires, glass threads or fibers, boron fibers, graphite fibers, or high-tensile strength synthetic fibers such as "Kevlar" fibers. KEVLAR is a trademark of E. I. du Pont de Nemours and Company, Wilmington, Del., for a synthetic fiber having a tensile strength of approximately 525,000 PSI with an elastic modulus of 19,000,000. At this time, my preferred material for the filamentary elements is music wires or Kevlar fibers, which are embedded in a suitable adherent matrix material, such as epoxy plastic.

The shouldered end caps 24 and 26 are formed of suitably strong, lightweight, relatively non-compressible structural material, for example, such as aluminum or fiber-reinforced plastic, and are held tightly abutting against the opposite ends of the casting 22 by a pair of high strength, minimum stretch bands 34 which encircle the container 20 in the longitudinal direction. These bands 34 are symmetrically located on opposite sides of the longitudinal axis of the container 20 and serve to resist the axial thrust against the end caps 24 and 26 by the high internal pressures generated, as will be explained further below. They are fabricated by continuously winding a lay-up of filamentary elements in the desired oval configuration for the band. These filamentary elements are embedded in a suitable adherent epoxy matrix material for making the band, such as the matrix material described above for constructing the casing 22. My presently preferred filamentary elements for use in winding the bands 34 are those having a very high modulus of elasticity, such as that of steel, i.e. music wires, or even higher.

Figures 3, 4:
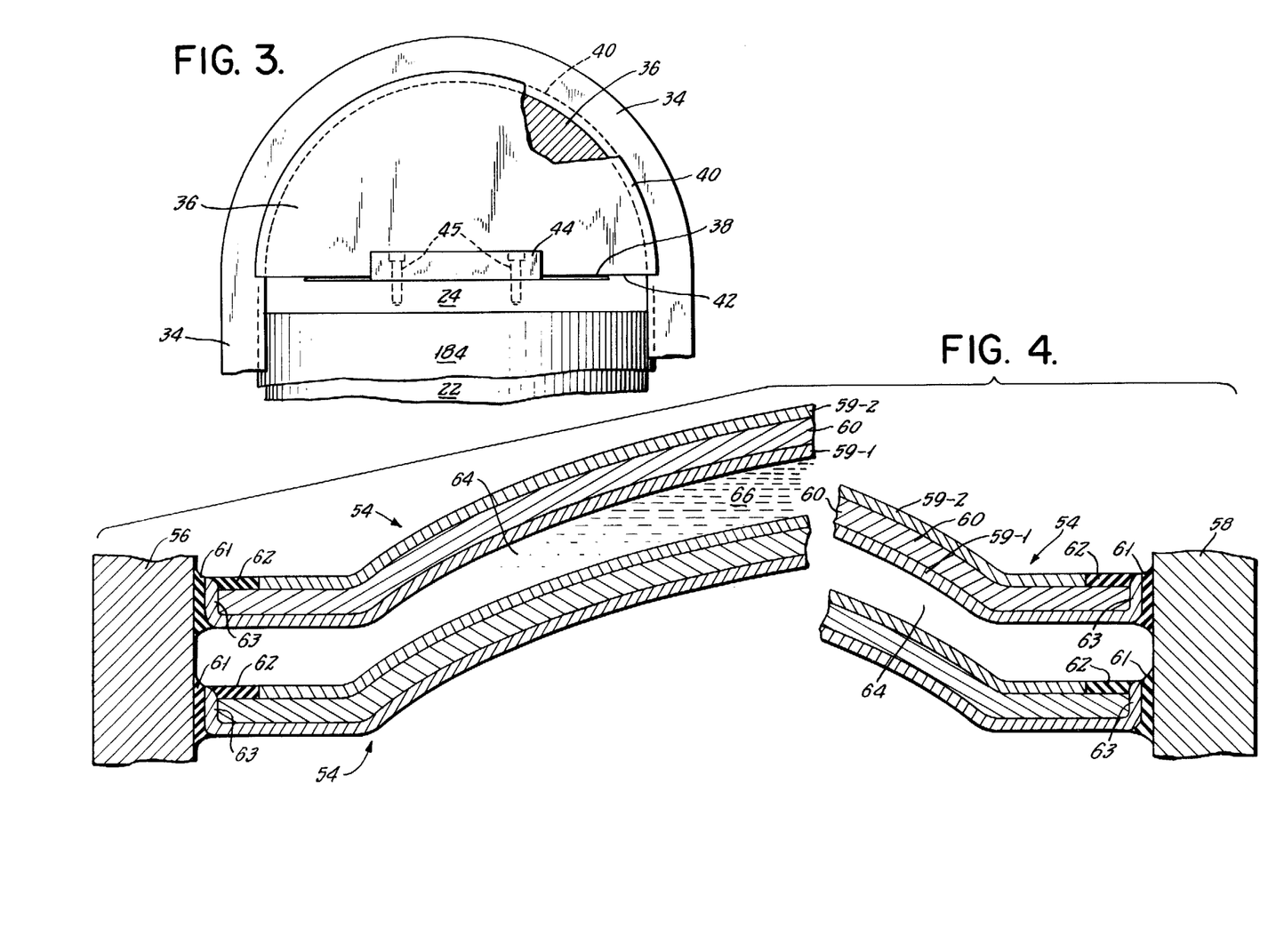
FIG. 3 is a partial side elevational view showing one end of the apparatus of FIGS. 1 and 2.
FIG. 4 is an enlarged cross-sectional view of two of the multiple movable vanes included in the apparatus and each containing a meltable wax material.

As seen in FIG. 3, these longitudinal bands 34 pass around semi-circular saddles 36 which are seated against flat end surfaces 38 on the respective end caps 24 and 26. Each of these saddles 36 has spaced flanges 40 on either side of retaining its band in place.

The manner in which the container 20 is assembled is to place the pre-formed oval bands 34 around their respective saddles 36 and then to slide the bases 42 of the saddles onto the end surface 38. Retainer blocks 44 are then secured in place by suitable fasteners such as machine screws 45 so that the retainer blocks are held in place snug against the saddles.

Within the interior region 32 are modular assemblies 50-1, 50-2, 50-3 and 50-4 of multiple thermally expandable vanes 54 which are mounted for edgewise swinging movement back and forth between heated (H) zones 51 and cooled (C) zones 52. Although four of these modular vane assemblies 50 are shown in FIG. 2, namely, at 50-1, 50-2, 50-3, and 50-4, it is to be understood that six, eight, ten or more of them may be included in a single container 20 depending upon the axial length of the container. It is desired that these vane assemblies 50 extend over substantially the entire length of the interior 32.

As seen in plan view in FIG. 1, the vanes 54 are generally sector-shaped; as seen in edge view in FIGS. 2 and 4, they are mounted in closely spaced generally parallel relationship. Each of the vane assemblies 50-1, 50-2, 50-3 and 50-4 includes inner and outer cylindrically curved sheet-like frame members 56 and 58, concentric about the axis 23. The multiple vanes 54 extend radially with small spaces between them. They are mounted spanning across between the inner and outer frame member 56 and 58. As shown enlarged in FIG. 4, each of the vanes 54 has a sandwich construction including two thin layers 59-1 and 59-2 of a material of excellent heat conductivity, preferably aluminum, with a layer of wax material 60, with a large thermal coefficient of expansion in the operating temperature range, sandwiched between them. For example, as shown, each of the surface layers 59 has a thickness of approximately 0.01 of an inch and the wax material filling 60 has a thickness of approximately 0.02 of an inch, making an overall thickness of approximately 0.04 of an inch for each of the vanes 54.

As shown in FIG. 4, one of the aluminum layers 59-1 in each vane extends inwardly and outwardly beyond its companion layer 59-2 and is secured to the respective frame member 56 and 58 by a stretchable, flexible bonding cement 61, such as silicone rubber. The vane 54 has an upwardly arched configuration for stiffening the sandwich construction. It is to be noted that the arch of each vane is a surface of revolution concentric about the axis 23, i.e. the arch is a portion of a toroidal surface. Thus, all of the localized regions of any given arch at a given radial distance from the axis of revolution are at the same elevational level. The lower layer 59-1 is upturned all of the way around its perimeter to form an end wall 63, and the enclosing layers 59-1 and 59-2 are joined together by a stretchable flexible perimeter seal 62, shown as being formed of silicone rubber. Thus, the wax material 60 is encased but is free to expand and contract within its sandwich-like vane structure because the two enclosing layers 59 can readily move toward and away from each other as permitted by the stretchable, flexible perimeter barrier seal 62. The vanes 54 themselves can expand relative to the support members 56 and 58 because of the stretchable, flexible bonding mount 61.

The surface layers 59 and the stretchable perimeter barrier 62 contain and confine the wax material 60 and maintain its shape integrity when the wax material is melted. Moreover, the thin aluminum layers 59 provide for good heat conductivity into and out of the wax material 60. In addition, the aluminum material of the layers 59 themselves, having a relatively high coefficient of thermal expansion, contributes to the overall volumetric expansion of the vane assemblies 50.

By virtue of the fact that the wax material is separated into multiple discrete units as provided by the numerous vanes 54 and by virtue of the thin and wide area configuration of each wax layer 60, there is a large surface-to-volume ratio for this wax material for enabling heat energy to flow rapidly into and out of it in spite of its inherently relatively poor specific heat conductivity. In other words, the relatively large surface-to-volume ratio of the vane configuration facilitates the heat flow into and out of the wax material during its expansion and contraction.

As seen in plan view in FIG. 1 each sector-shaped vane 54 may be divided into a plurality of sub-sectors X, Y and Z, each containing a wax material melting at a somewhat different temperature range for advantageous reasons as described further below.

The relatively narrow spacing 64 (FIG. 4) in the axial direction between vanes 54 is preselected to flow adequate liquid between the vanes to provide sufficient heat transfer to produce rapid melting and resolidifying of the wax material 60 in each vane during each cycle of operation at the operating temperatures.

In order to produce maximum efficiency in utilization of the volume of the interior region 32, the vane-to-vane spacing 64 should not be unduly large. In this example, the spacing 64 between vanes is shown as approximately 0.05 of an inch, which is slightly greater than the overall thickness of each vane itself.

In order to provide for the reciprocating swinging movement of the vane assemblies 50-1, 50-2, 50-3 and 50-4 (as shown), there is a center support column 68 (FIGS. 1 and 2) extending along the axis of the container 20. As shown in FIG. 2, this column 68 is fixed in position by its ends seating into sockets 70 in the end caps 24 and 26. This support column 68 may be solid or it may be hollow as shown. A plurality of rotatable gear rings 72 encircle this support column. A first pair of these gear rings 72-1 are connected by brackets 75 to the inner frame member 56 of the first vane assembly 50-1.

The bracket 75 is assembled with its gear ring 72-1 by a splined root engaging in a splined socket, as shown in cross section in FIG. 1. Similarly, second, third and fourth pairs of these gear rings 72-2, 72-3 and 72-4 are connected by brackets 75 to the inner frame members 56 of the second, third and fourth vane assemblies 50-2, 50-3 and 50-4, respectively.

Figure 5:
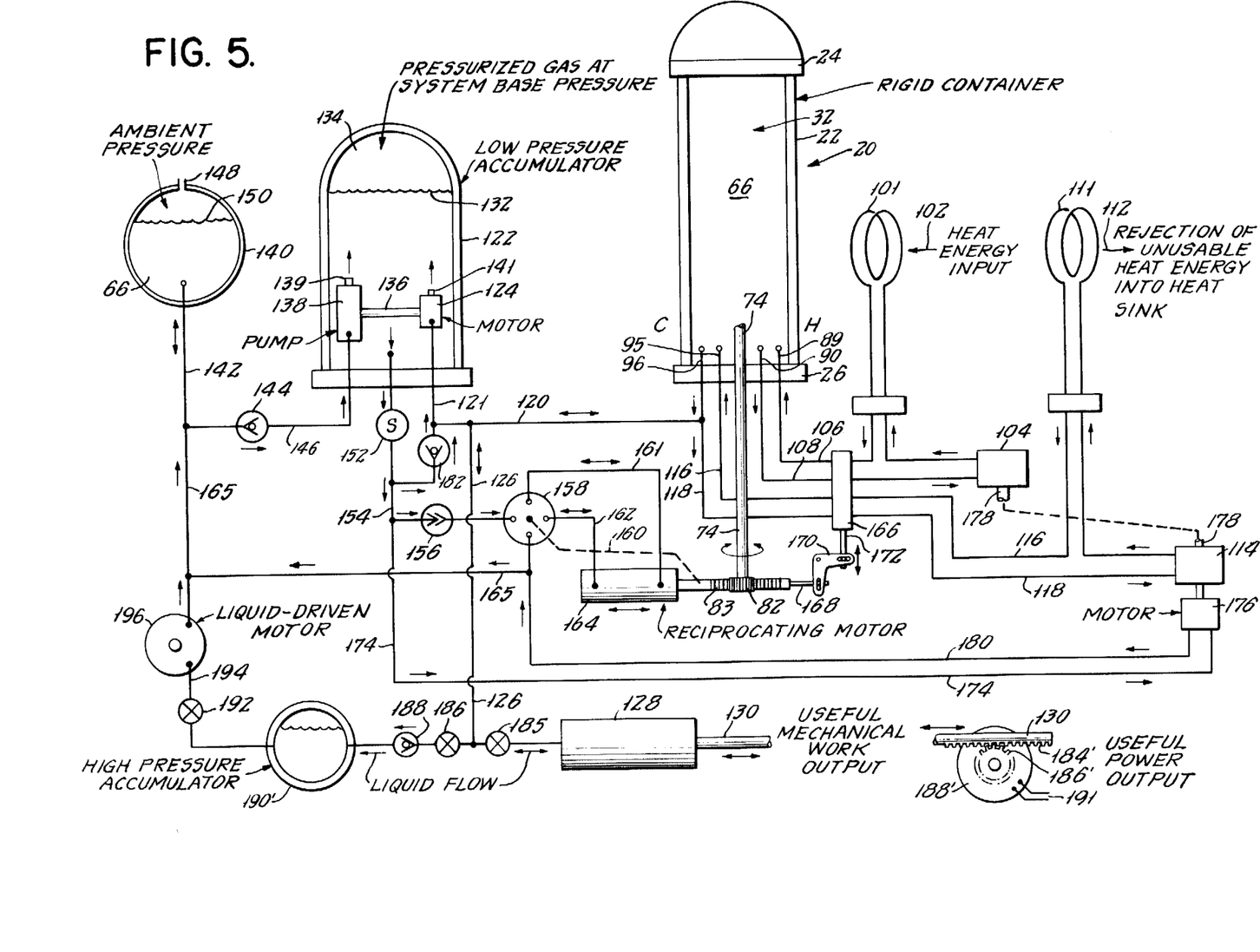
FIG. 5 is a schematic circuit diagram of a system embodying this invention and for practising the method of the invention.

For rotating the gear rings 72, there is a pair of parallel rotatable drive shafts 74 and 76, whose upper ends are seated in sockets 78 (FIG. 2) in the upper end cap 24. The lower ends of these drive shafts 74 and 76 extend down through sealed passageways 80 in the lower end cap 26. As shown in FIG. 5, a pinion gear 82 (only one can be seen) is mounted on the lower end of each drive shaft 74 and 76. A longitudinally reciprocatable double rack 83 engages these two pinion gears 82 for simultaneously rotating the respective drive shafts 74 and 76 in opposite directions as the rack 83 is moved in one direction. The drive shafts 74 and 76 carry drive gears 84 and 86, respectively, engaging the gear rings 72. The drive gears 84 on the drive shaft 74 engage the respective pairs of gear rings 72-1 and 72-2 for swinging the vane assemblies 50-1 and 50-3 counterclockwise, as seen in FIG. 1, from the heated zone 51 to the cooled zone 52, while the drive gears 86 on the other drive shaft 76 engage the respective pairs of gear rings 72-2 and 72-4 for swinging the other vane assemblies 50-2 and 50-4 clockwise, as seen in FIG. 1, from the other heated zone 51 to the other cooled zone 52.

When the rack 83 (FIG. 5) is moved back in the other direction, then every movement is reversed. Thus, the vane assemblies 50-1 and 50-3 are now swung clockwise from the cooled zone 52 back to the heated zone 51, as seen in FIG. 1, while the other vane assemblies 50-2 and 50-4 are swung counterclockwise, as seen in FIG. 1, from the other cooled zone 52 back to the heated zone 51. The opposed reciprocating swinging movement of the vane assemblies 50-1 and 50-2, as seen in FIG. 1, is somewhat analogous to the opposed reciprocating swinging movement of the wings of a butterfly, and may be called a butterfly motion.

To establish and maintain the heated zones 51, there is a hollow partition 88 having a pair of ducts 89 and 90 therein which communicate through ports 92 with the interior region of the container. Heated liquid travels in through the incoming duct 89 and flows through the ports 92 into the heated zones 51, as shown by the flow arrows 97. After the heated liquid has become somewhat cooled by heat transfer into the reciprocating vanes (i.e., exhausted or spent), it is returned through other ports 92 and travels out through the outgoing duct 90. The manner in which this liquid in the incoming duct 89 has been heated will be described later.

Similarly, to establish and maintain the cooled zones 52, there is another hollow partition 94 having a pair of ducts 95 and 96 therein with ports 92. The cooled liquid travels in through the incoming duct 95 and passes through ports 92 into the cooled zone 52, as shown by the flow arrows 93. After this cooled liquid has become somewhat warmed by heat transfer from the reciprocating vanes, it is returned through other ports 92, travelling out through the outgoing duct 96. The manner in which this liquid in the incoming duct 95 has been cooled will be described later.

The replenishment of the heated and cooled zones 51 and 52 by the flows 93 and 97 is timed to occur when the respective vane assemblies are approaching the cooled zone 52, because the pressure within the interior 32 is then low.

The partitions 88 and 94 each has mounting flanges 98 which are secured to the cylindrical casing 22 by bonding cement. Also, the inner portion of each of these partitions 88 and 94 has a longitudinally extending semicircular groove 99 which nests against the respective drive shaft 74 and 76 to provide mutual support.

It is desired to avoid intermixing of the liquid in the heated and cooled zones 51 and 52 insofar as it is reasonably possible, to maintain the thermal gradient and to avoid dissipation of heat energy. To inhibit such intermixing, the liquid 66, preferably water, may be thickened with a thixotropic material for reducing turbulence as the vane assemblies 50 are reciprocated between the heated and cooled zones 51 and 52.

In addition, the presence of such a thixotropic agent reduces the convective movement of the liquid 66 and thereby reduces loss of heat energy by convection between the heated and cooled zones 51 and 52.

In order to force a maximum of the liquid 66 to flow through the multiple narrow spaces 64 between vanes 54, there is at least one wiper seal member 100 (FIG. 1) on the exterior of the outer movable frame 58. Each wiper seal member 100 is resilient for sliding contact with the inner surface of the casing 22. Thus, good heat transfer is accomplished as the heated and then the cooled liquid is alternately caused to flow into these multiple narrow spaces 64. Moreover, the respective partitions 88 and 94 serve as barriers for blocking movement of the liquid en masse within the container 20, thereby forcing the liquid to become displaced into the multiple spaces 64 as the vane assemblies approach these partitions in their butterfly motion.

By virtue of the fact that the vane assemblies 50 are swinging in opposed butterfly relationship, there is an inherently balanced pressure situation such that the liquid does not tend to move past these barriers 88 and 94.

Reference will now be made to FIG. 5. The heated liquid is obtained from a heat exchanger 101 exposed to a low temperature heat energy source represented by the heat energy input arrow 102. A circulating pump 104 pumps the heated liquid through a supply line 106 leading into the incoming duct 89 (see also FIG. 1) and this pump returns the spent heated liquid from the outgoing duct 90 through a return line 108 back to the heat exchanger 101.

The cooled liquid is similarly obtained from another heat exchanger 111. This heat exchanger 111 is exposed to a heat sink such as a body of water or cold air or to a cooling tower, and the rejection of unuseable heat energy into the heat sink (not shown) is represented by the outflowing arrow 112. A second circulating pump 114 pumps the cooled liquid through a supply line 116 into the incoming duct 95 (see also FIG. 1). This pump 114 also returns the spent cooled liquid from the outgoing duct 96 through a return line 118 back to the heat exchanger 111.

The relatively great expansion of the wax material 60 (FIG. 4) within the interior 32 of the rigid container 20 (FIG. 5) causes a pressure rise in the confined liquid 66 therein (confined by means explained in detail further below). As a result of the increased pressure, the liquid from rigid container 20 flows through a reciprocating flow line 120, and through a line 126 connected into a cylinder 128 containing a piston (not shown) thereby driving the piston rod 130 toward the right in the illustration and producing useful mechanical motion which can be used to perform work as may be desired. By virtue of the relatively high pressure which is obtained from the relatively large expansion of the wax material 60, the extending movement of the piston rod 130 can be quite forceful if desired for performing a wide variety of types of work.

When the pressure within the rigid container 20 is diminishing, due to contraction of the wax material 60, then the pressure of the liquid in the interior 32 decreases causing the liquid to flow back through the line 120 into the rigid container 20. The piston rod 130 is caused to retract and thereby to follow the diminishing fluid within the cylinder 128 by means of a return spring (not shown).

For the purpose of preventing vaporization or boiling throughout the system, some of the pressurized liquid from rigid container 20, flowing through reciprocating flow line 120, also may occasionally flow through a line 121 into a low pressure accumulator 122. There is a bladder 132 within the low pressure accumulator 122 defining a compressed gas chamber 134 containing compressed gas at a selected suitable base pressure for the system (for example, such as 100 pounds per square inch [PSI]). During increase in pressure within the container 20, the outgoing liquid flows to the left in the illustration through the line 120 and some of it may enter the low pressure accumulator 122 by passing through a gear motor 124 of the positive-displacement "GEROTOR" type. The small gear motor 124 is connected by a shaft 136 to a larger similar device 138, also of the positive-displacement "GEROTOR" type, which serves as a pump.

The system base pressure of the gas in the compressed gas chamber 134 is determined by the selected gear-volume ratio between the motor 124 and the larger diameter pump 138. Whenever the pressure in the low pressure accumulator 122 is slightly below that which is necessary to counterbalance the much higher pressure occurring in the lines 120 and 121, then the motor 124 is momentarily able to overcome the pressure occurring at the discharge outlet 139 of the pump 138. Accordingly, some of the pressurized liquid flows from the line 121 through the motor 124 and is discharged from the motor outlet 141 into the accumulator 122. Simultaneously, liquid is pumped from the line 146 through the pump 138 and is discharged at 139 into the chamber 122. As soon as balance is regained between the higher pressure in lines 120, 121 and the much lower pressure in the accumulator 122, this pumping automatically stops due to the re-established counterbalancing effect of accumulator back pressure against the motor and pump outlets 141 and 139, respectively.

Consequently, a peak pressure ratio of a chosen intensity (as, for example, such as 3000 P.S.I. to 100 P.S.I.) is maintained in lines 121, 120 and 126 by the selected gearvolume ratio between motor 124 and pump 138. Due to this ratio, the approximate 100 P.S.I. gas pressure in chamber 134 can be translated into the selected much higher peak system pressure in the lines 120, 121 and 126, and thus the approximate 100 P.S.I. acting as back pressure on the pump 138 holds motor 124 in check by virtue of the larger leverage of the pump 138.

Generally, high pressure fluid flow through motor 124, and low pressure flow from line 146, through pump 138, can occur only when fluid is withdrawn from the low pressure accumulator 122 through a valve 152 into a line 154.

When the valve 152 has been opened to draw liquid from the accumulator 122, then pump 138 draws liquid 66 from a reservoir 140 through a line 142, through a check valve 144, and through a line 146 leading into the pump 138 and thence into the accumulator 122. The reservoir 140 has a vent 148 into the atmosphere (to allow atmospheric pressure to be maintained), and a bladder 150 covers the liquid 66 for preventing contamination of the liquid by atmospheric gases or dirt particles.

In order to start operation of this system for converting heat energy into useful mechanical motion, start-up valve 152 is opened allowing liquid to be pushed out of the accumulator 122 by the compressed gas in chamber 134. This expelled liquid travels through line 154 and through a speed-control valve 156 leading into a reversing valve 158 which is mechanically engaged to the movable double rack 83 (one side shown), as indicated by the dotted line 160. This reversing valve 158 is connected through lines 161 and 162 into opposite ends of a cylinder 164 for reciprocating a piston (not shown) therein in order to reciprocate the double rack 83. The control valve 156 may be a manually or automatically adjusted needle valve used for speed regulation to control the cyclic rate of reciprocation of the double rack 83.

The mechanical interconnection 160 causes the reversing valve 158 to reverse its position as the piston within the cylinder 164 nears the end of the cylinder for producing reciprocation of the double rack 83, as described above. The liquid returns from the reversing valve 158 through a common return line 165 leading back into the reservoir line 142 and also leading into the check valve 144.

Movement of the double rack 83 also serves to operate a fast-acting shut-off valve 166 for controlling the flows of heated and cooled liquid through the respective lines 106, 108, 116 and 118. When the valve 166 has shut off the flow of fluid through these four lines, pressure within the thus confined liquid 66 (in the interior 32 of rigid container 20), generated by the expansion of the wax material 60, is caused to increase against the resisting force of the work load. The double rack 83 has an extending rod 168 which is connected through a pivoted lever crank 170 to operate an actuating rod 172 of the valve 166. The arms of the pivoted crank 170 have elongated slots therein engaging pins on the rods 168 and 172 for accommodating arcuate motion of its arms relative to the reciprocating rods 168 and 172.

This fast-acting shut-off valve 166 serves to replenish the heated and cooled liquid in the zones 51 and 52 (FIG. 1) when the vane assemblies 50 (FIG. 2) are in the cold zones 51, i.e., when the pressure in the interior 32 of the rigid container 20 is low.

The liquid flowing through the start-up valve 152 also passes through line 154 into line 174 leading to a positive-displacement gear motor 176 for driving the circulating pumps 104 and 114 which are mounted on a common shaft 178. The liquid from the motor 176 returns through a return line 180 leading to the common return line 165.

If desired, the start-up valve 152 may be manually operated. However, it is preferable in many cases to make operation of this valve 152 temperature-responsive to the temperature of the heat source 102. Thus, the whole system will automatically commence operating whenever the temperature of the source 102 is appropriate and will automatically cease operation whenever the heat source temperature becomes too low.

There is a check valve 182 which interconnects the line 154 and the reciprocating flow line 120. This valve 182 only operates when the pressure of the liquid in the accumulator 122 exceeds that in the rigid container 20, in other words, for supplying small amounts of make-up liquid into the interior 32, as needed.

Among the advantages of positioning the motor 124 and pump 138 within the liquid in the accumulator are those resulting from the fact that any leakage about the shaft 136 is totally contained and a minimum of piping connections are needed since the outlets from the pump and motor are directly into the liquid within the accumulator 122.

It is to be understood that there can be a plurality of the rigid containers 20, connected in parallel, into the one system as shown in FIG. 5. The double rack 83 would serve to turn the drive shafts of all of the rigid containers 20, and their reciprocating flow lines would all be connected into the accumulator infeed line 121.

If desired, the line 126 may be connected through a check valve 188 into a high pressure accumulator 190. Thus, the liquid in the line 126 is pumped into the high pressure accumulator and is retained therein by its check valve ready to perform useful mechanical work later as desired. When such a high pressure accumulator is employed, then an output line with a shut-off valve is used to feed the pressurized liquid from the high pressure accumulator into a positive displacement gear-type motor 196 for producing useful mechanical work. The pressurized liquid in such a high pressure accumulator may serve as a source of power output, for example, for driving a positive displacement gear-type motor to drive electrical generation apparatus, thereby producing useful power output.

It is to be noted that the system shown in FIG. 5 is a recirculating system, that is, no fresh liquid 66 is introduced from the outside. The liquid 66 is water which has been de-gassed so as to make it as incompressible as possible. It may contain a thixotropic agent as discussed above.

The component exposed to the water, such as the shafts 74, 76, gears 84, 86, gear rings 72, brackets 75, partitions 88, 94, etc. within the rigid container 20 are preferably made of non-corrosive materials.

Although in FIGS. 2, 3 and 5, the rigid container 20 is drawn in upright position for purposes of clarity of illustration, the preferred orientation is for the cylindrical axis 23 to be horizontal with the heated zones 51 (H) being at the top, as illustrated in FIG. 1. Thus, thermogravitational action tends to maintain stratification of the liquid thereby aiding in preventing undesired mixing of the liquid from either zone into the other zone. For conserving energy, a thermal insulation jacket 184 (FIGS. 1 and 2) surrounds the casing 22.

The wax material 60 may be any one of the various commercially available waxes having a melting/resolidifying transition temperature somewhere between the temperatures occurring in the heated and cooled zones 51 and 52. Therefore, the wax material becomes cyclically melted and then resolidified as the vanes 54 move back and forth into heat exchange relationship with the heated or cooled liquid 66 in these respective heated and cooled zones. It is preferred to use a commercially available wax material which has a relatively great expansion within the operating temperature range and which does not chemically interact to any significant extent with aluminum. A presently preferred example of such a wax material is Ozokerite wax, which is derived from petroleum.

At the present time, my best mode of practising this invention is to employ one of the Ozokerites of commerce available in the United States.

Figure 6:
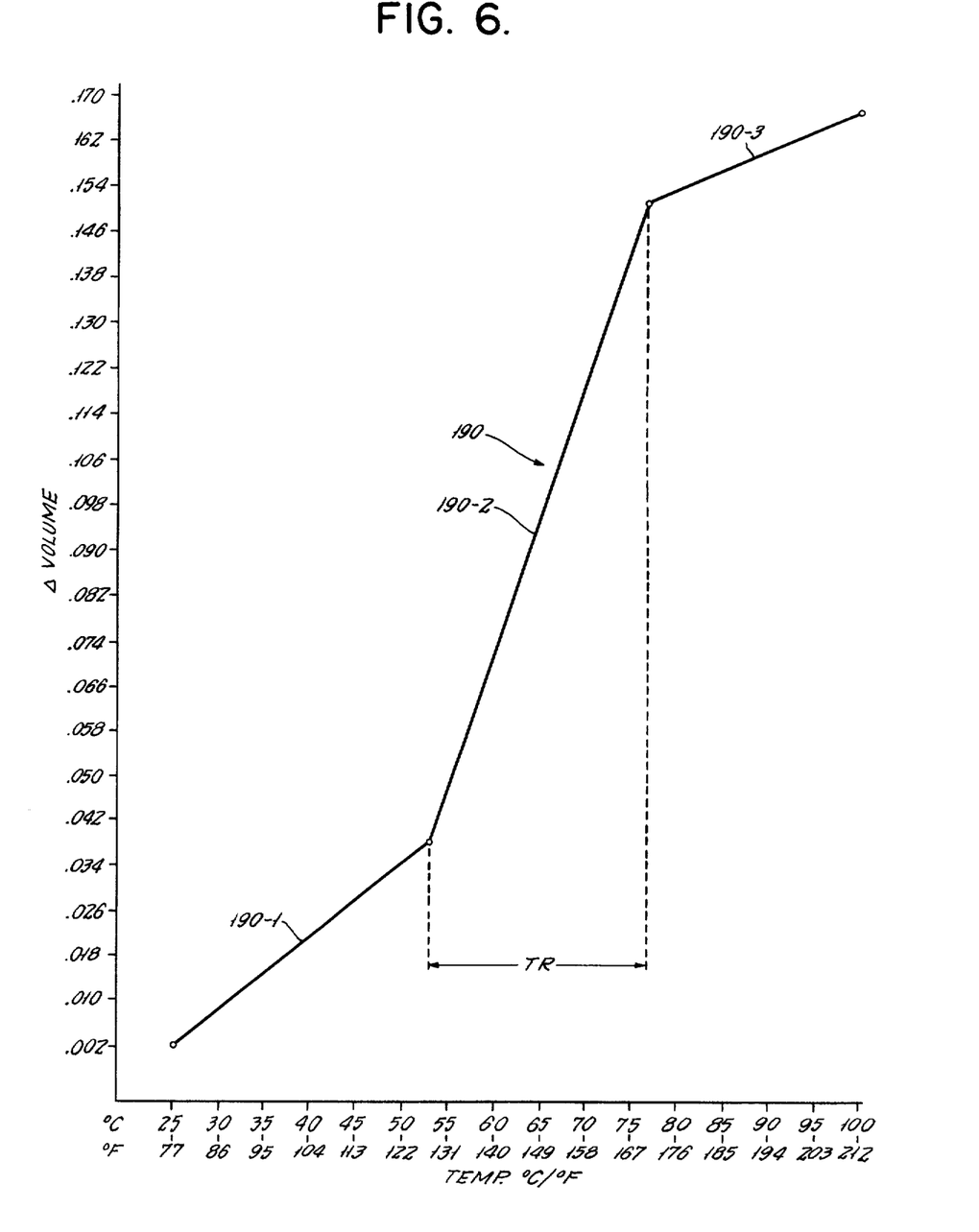
FIG. 6 is a graph plotting the expansion of a preferred wax material over the operating temperature range.

FIG. 6 is a graph plotting an approximate curve 190 of the volumetric expansion of Ozokerite wax material having a melting/resolidifying transition temperature range of approximately 125° F. to 170° F. This graph extends over the temperature range from room temperature up to approximately 200° F. It is to be noted that a relatively large volumetric expansion occurs over a relatively small transition range TR in temperature as the wax material is heated to become melted, and conversely a relatively large volumetric contraction occurs over this same small transition range in temperature as the wax material is cooled to re-solidify. There is also a relatively large expansion of this solid wax material in going from room temperature up to the transition temperature range.

In FIG. 6, the legend "$\Delta$VOLUME" means change in volume. Thus, along the curve portion 190-1 from room temperature up to the beginning of the transition range, there is a volumetric expansion of approximately 0.038; in other words, approximately 3.8% volumetric expansion occurs. After an increase in temperature along the curve portion 190-2 through the transition range, the volumetric expansion reaches the amount of approximately 0.150; in other words, approximately 15% volumetric expansion has occurred, and so forth.

With reference to FIG. 1, the vanes 54 may include only one wax material melting/resolidifying over a preselected transition temperature range. There is a thermal gradient between the heated and cooled zones 51 and 52. Thus, one edge portion of each vane is always hotter than the other edge portion, regardless of the momentary position of the vane in its movement. This situation means that the localized portion of the wax material in the hotter edge portion of each vane is always operating within a higher temperature range than that localized portion thereof in the cooler edge portion of each vane. Therefore, as seen from the approximate curve 190 in FIG. 6, one of such localized portions of the wax material in each vane will be operating over a more advantageous portion of the curve 190 than another because of the differing proportionate volumetric expansion occurring per degree change in the various sections 190-1, 190-2 and 190-3 of this curve. In other words, one such localized portion of the wax material in each vane is being more effectively utilized from an expansion/contraction viewpoint than another.

Consequently, in order to optimize utilization of the existent temperature gradient, each of the vanes 54 is shown divided into a plurality of sub-sectors X, Y and Z filled with respective wax material melting/resolidifying in different transition temperature ranges. For example, the Ozokerite wax in sub-sector X has a lower melting/resolidifying transition temperature range; that in sub-sector Y has an intermediate melting/resolidifying transition temperature range; and that in sub-sector Z has a higher melting/resolidifying transition temperature.

Thus, it is seen that the wax material in the respective vane sub-sectors X, Y and Z have lower, intermediate and higher melting/resolidifying transition temperature ranges for achieveing most effective utilization of the temperature gradient in obtaining expansion/contraction as the vanes are swung back and forth in cyclic transition from heated-to-cooled-to-heated zone. It is to be understood that various wax materials having other transition temperature ranges may be employed depending upon the operating temperature ranges being used in a particular application.

It is to be noted that the relatively non-compressible liquid 66 is being used simultaneously in performing a number of different functions: (a) it is the heat transfer medium, (b) it is the volumetric displacement transfer medium, (c) it is the pressure transmitting medium, and (d) it is the temperature-gradient producing medium, such temperature gradient occurring within the rigid container 20.

It is to be appreciated that the low pressure accumulator 122 (FIG. 5) performs five functions: (1) it provides self-contained start-up liquid volume under pressure for operating the overall system for a sufficiently long period of time to establish enough difference in temperature between the heated and cooled zones 51 and 52 for normal operation to commence; (2) it establishes a base pressure for the overall system below which the high pressure pressurized portions of the system will not fall (except during start-up); (3) this base pressure prevents vaporization or boiling throughout the pressurized portions of the system; (4) this base pressure acts against the discharge ports 139, 141 of the pump-motor assembly 124, 136 and 138, thereby enabling the relatively low base pressure in the accumulator 122 to counterbalance the chosen higher peak level in the high pressure portions of the system, and (5) this base pressure in the accumulator serves to drive the pumps 104 and 114 associated with the respective heat exchangers 101 and 111 for providing heat energy input and rejection.

It is important to prevent the wax material 60 from becoming oxidized which would deleteriously affect its desired characteristics. Also, it is important to avoid overheating the wax material up to an elevated temperature at which it would become damaged. The operating range of temperatures involved with low temperature heat energy are well below those at which thermal damage to the wax material would occur.

It is to be noted that advantageous heat regeneration occurs as the vane assemblies 50 are moved through the liquid medium 66 in the rigid confining container 20. As discussed above, there is a temperature gradient within this liquid between the respective heated (H) and cooled (C) zones 51 and 52. In order to explain this heat regeneration action, the reader is invited to consider what occurs as each vane assembly is moved from a heated zone 51 to a cooled zone 52 and then back again.

While each vane assembly briefly resides in its heated zone 51, the vanes 54 (or the respective sub-sectors Z, Y and X of the vanes, as the case may be) become heated up substantially to the temperature of the surrounding liquid medium. Thus, wax material 60 (FIG. 4) plus the containing aluminum envelope 59 each becomes substantially fully expanded to the extent possible under the operating temperature levels existent in the heated zone.

Then, as each heated vane assembly is moved at a moderate rate of speed from the heated zone 51 toward the cooled zone 52, each vane 54 (or sub-sector, as the case may be) is travelling through successive localized regions of the liquid medium 66 which are progressively cooler, by virtue of the factor that there is a temperature gradient in this liquid. Each vane (or sub-sector) becomes progressively cooled by giving successive amounts of transferable heat energy to the successive localized regions of the liquid medium.

Therefore, as each vane (or sub-sector) reaches the limit of its travel into the cooled zone 52, the vane (or sub-sector) has become cooled to temperature only somewhat above the temperature encountered in the cooled region. Accordingly, only a modest amount of transferable heat energy remains in each vane (or sub-sector) to be given off to the surrounding liquid. Consequently, the surrounding liquid in the cooled zone does not become warmed to any great extent.

In overall effect, in travelling down the temperature gradient from the heated to the cooled zone, each vane (or sub-sector) deposits (i.e., leaves behind) a successive portion of its transferable heat energy in each successive localized region of the liquid medium which was encountered along the temperature gradient.

While each vane (or sub-sector) briefly resides in the cooled region, it becomes cooled substantially to the temperature of the surrounding medium. Thus, the wax material 60 (FIG. 4) plus the containing aluminum envelope 59 each becomes substantially fully contracted to the extent possible under the operating temperature levels existent in the cooled zone.

Then, as each cooled vane (or sub-sector) is moved at moderate speed from the cooled zone 52 toward the heated zone 51, it is travelling through successive localized regions of the liquid medium which are progressively warmer. Each vane (or sub-sector) becomes progressively warmed by picking up successive amounts of transferable heat energy from the successive localized regions of the liquid medium.

Therefore, as each vane (or sub-sector) reaches the limit of its travel into the heated zone 51, the vane (or sub-sector) has become warmed to temperature only somewhat below the temperature encountered in the heated region. Accordingly, only a modest amount of transferable heat energy remains to be picked up by each vane (or sub-sector) from the surrounding liquid medium. Consequently, the surrounding liquid medium in the heated zone does not become cooled to any great extent.

In overall effect, in travelling back up the temperature gradient from the cooled to the heated zone, each vane (or sub-sector) picks up the successive portions of transferable heat energy previously deposited in the successive localized regions of the liquid medium 66. Thereby, some of the heat energy is being used over again in each cycle of movement, and this reuse of the heat energy is a heat regenerative effect which increases the overall efficiency of utilization of the available heat energy.

In summary, by reciprocating the vanes 54 at a moderate rate of speed, a relatively great amount of heat regeneration (and thereby efficiency) is obtained.

It is possible to increase the rate of mechanical work output (Horsepower output) of the system shown in FIG. 5 by reciprocating the vane assemblies 50 more rapidly, i.e., by decreasing the time duration of each cycle, thereby producing an increased number of cycles per minute. However, the shortened cycle time allows for less of the heat regeneration action to occur during each cycle. Therefore, in operating this system of FIG. 5 the speed-control valve 156 is set at the optimum cycle speed considering the various factors of efficiency and Horsepower output. The optimum setting is a compromise between the desire for maximizing heat regeneration and efficiency on the one hand, and the desired for maximizing the rate of mechanical work output (power output) of the system on the other hand.

In cases where a relatively large amount of waste heat energy is consistently available (in other words a redundant amount of heat energy happens to be available) then the optimum setting is to favor increased rate of mechanical work output at the expense of heat regeneration and efficiency. Conversely, where a marginal amount of heat energy is available or solar heat energy is being used, then the optimum setting is to favor increased heat regeneration and efficiency. Advantageously, this system provides a flexibility in being adjustable in efficiency and Horsepower output to match the conditions of the available heat energy 102.

The preferred location of the valve 166 (FIG. 5) will now be discussed. In FIG. 5, this valve is schematically shown as being at a distance from the rigid container 20. In actual practice this valve 166 is located as closely adjacent to the end 26 of the container 20 as possible in order to minimize the available elasticity of the fluid flow lines containing the cyclically highly pressurized liquid medium. If desired, this fast-acting shut-off valve 166 may be incorporated directly within an enlarged end 26 of the rigid container 20.

It is to be understood that the duct 96 which is connected through a passage in the container end 26 to the flow line 120 serves as a port in the rigid container 20. The relatively great cyclic volumetric expansion of the wax material plus the volumetric expansion of the aluminum envelopes cyclically drives the liquid 66 out of the rigid container 20 through this port. Conversely, during the intervening cyclic contraction of the wax material plus the aluminum, the liquid 66 flows inward through this port into the rigid container.

The resultant movement of the piston rod 130 may also serve as a source of power for driving a rack 184' and pinion gear 186' for turning generator apparatus 188' to produce electrical power output on lines 191.

Methods of tightening the bands 34 around the rigid container 20 after assembly will now be discussed. If it is desired to tighten the tension bands 34 which surround the container 34 in the longitudinal direction, this can be accomplished after the bands have been installed together with their saddles 36 by driving wedges or shims (not shown) between the bottom surface 42 of the saddle and the flat surface 38 on the end cap 24 or 26.

Alternatively, a system of jack screws (not shown) can be incorporated in one of the saddles 36 for each band for slightly elevating the respective saddles slightly away from the end cap 24 or 26, thereby tightening the bands 34.

As seen in FIG. 5, a shut-off valve 184 may be used to shut off liquid flow into and out of the cylinder 128. Another shut-off valve 186 may be opened for allowing pressurized liquid to flow through a check valve 188 into a high pressure accumulator 190', thereby accumulating a volume of liquid therein under pressure. When a further shut-off valve 192 is opened, the pressurized liquid is allowed to flow from the accumulator 190', through a line 194, and through a positive-displacement type liquid-driven motor 196 for performing useful work. The liquid flows from the outlet of the motor 196 into the common return line 165.

As used herein, the terms "useful work" or "useful work output" are intended to be interpreted broadly to include work and/or power in any of many forms; to include any useful motion or displacement of a body, fluid or liquid; to include any useful motion or displacement produced by a force having a component in the direction of the motion or displacement produced; to include any accumulation of potential energy capable of producing useful work, for example, such as the accumulation of a fluid or liquid under pressure, or the raising of a weight or the pumping of liquid into a higher elevation with respect to the earth's gravitational field; to include any accumulation of kinetic energy capable of producing useful work, for example, such as the spinning of a flywheel; and to include the production of power or generation of power, for example, such as producing electrical power.

I claim:

1. The method of converting heat energy into useful work output comprising the steps of:

providing a rigid container having a port therein, said container being rigid for resisting expansion when the pressure therein rises to relatively high values, using said heat energy for heating a liquid, providing a heat sink, using said heat sink for cooling a liquid, providing multiple small masses of wax material, bringing said multiple small masses of wax material into heat exchange relationship with the heated liquid in said rigid container for heating said wax material for producing volumetric expansion of said wax material for driving such liquid out of said rigid container through said port, then bringing said multiple small masses of wax material into heat exchange relationship with the cooled liquid in said rigid container for cooling said wax material for producing volumetric contraction of said wax material for allowing such liquid to return into said rigid container, repeating said steps of bringing said multiple small masses of wax material into heat exchange relationship with the heated liquid in said rigid container and then bringing said multiple small masses of wax material into heat exchange relationship with the cooled liquid in said rigid container, and using the resulting flow of such liquid for producing useful work.

2. The method of converting heat energy into useful work output as claimed in claim 1, including the steps of:

enclosing each of said small masses of wax materail within an envelope of protective material.

3. The method of converting heat energy into useful work output as claimed in claim 2, in which:

said protective material has a high heat conductivity.

4. The method of converting heat energy into useful work output as claimed in claim 1, including the steps of:

cyclically relatively moving said multiple small masses of wax material back and forth with respect to the heated and cooled liquid within said rigid container for alternately bringing them into heat exchange relationship with such heated and then with such cooled liquid in said rigid container.

5. The method of converting heat energy into useful work output as claimed in claim 1, including the steps of:

preselecting at least one wax material for said multiple small masses capable of being melted by the temperature of the heated liquid and capable of being resolidified by the temperature of the cooled liquid, allowing said multiple small masses of wax material to remain in heat exchange relationship with the heated liquid until the wax material has melted, and allowing said multiple small masses of wax material to remain in heat exchange relationship with the cooled liquid until the wax material has resolidified, thereby producing a relatively great volumetric expansion and contraction of said multiple small masses of wax material for producing a relatively great resulting flow of such liquid.

6. The method of converting heat energy into useful work output as claimed in claim 1, including the steps of:

establishing a thermal gradient in liquid in said rigid container between the heated liquid and the cooled liquid, relatively moving said multiple small masses of wax material with respect to the thermal gradient in one direction for progressively bringing said multiple small masses of wax material into heat exchange relationship with such liquid at progressively higher temperature, then relatively moving said multiple small masses of wax material with respect to the thermal gradient in the opposite direction for progressively bringing said multiple small masses of wax material into heat exchange relationship with such liquid at progressively lower temperature, and causing said relative moving to occur at a moderate rate for allowing significant heat regeneration to occur.

7. The method of converting heat energy into useful work output comprising the steps of:

providing a rigid container having a port therein, said container being rigid for resisting expansion when the pressure therein rises to relatively high values, providing liquid in said container, using said heat energy for heating a first zone of the liquid in said rigid container, providing a heat sink, using said heat sink for cooling a second zone of the liquid in said rigid container, providing multiple small masses of wax material, alternately bringing said multiple small masses of wax material into heat exchange relationship with the heated liquid in said first zone for producing volumetric expansion of said wax material for driving the liquid out of said rigid container through said port and then bringing said multiple small masses of wax material into heat exchange relationship with the cooled liquid in said second zone for producing volumetric contraction of said wax material for allowing such liquid to return into said container, and using the resulting flow of the liquid for producing useful work.

8. The method of converting energy into useful work output as claimed in claim 7, including the steps of:

orienting said rigid container with respect to the earth's gravitational field for positioning the heated liquid in said first zone at a higher elevation than the cooled liquid in said second zone, whereby the resultant thermogravitational effect tends to minimize mixing of the heated and cooled liquid in said respective zone.

9. The method of converting heat energy into useful work output as claimed in claim 7, including the steps of:

cyclically moving said multiple small masses of wax material from said first zone to said second zone and then from said second zone to said first zone, and so on, for alternately bringing said multiple small masses of wax material into heat exchange relationship with heated and then with cooled liquid in said rigid container.

10. Apparatus for converting heat energy into useful work output comprising:

a rigid container having at least one port therein, a relatively non-compressible liquid, means for transferring said heat energy into some of said liquid in said rigid container for providing heated liquid therein, means for transferring heat energy out of other of said liquid in said rigid container for providing cooled liquid therein, wax material melting at a temperature below the temperature of said heat energy, and means for bringing said wax material into heat exchange relationship with said heated liquid in said rigid container for heating and melting the wax material for producing volumetric expansion of the wax material and for bringing said wax material into heat exchange relationship with said cooled liquid in said rigid container for cooling and resolidifying the wax material for producing volumetric contraction of the wax material and for repeating alternately said bringing of said wax material into heat exchange relationship with said heated liquid and with said cooled liquid, thereby causing flow of the liquid through said port for producing useful work.

11. Apparatus for converting heat energy into useful work output as claimed in claim 10, in which:

said rigid container has a circular cylindrical configuration including a cylindrical casing and a pair of spaced end closures in opposed relationship for closing opposite ends of said casing, said cylindrical casing including concentrically arranged high tensile strength filamentary elements bonded together by an adherent matrix material, and at least one high tensile strength member holding said end closures in spaced opposed relationship.

12. Apparatus for converting heat energy into useful work output as claimed in claim 11, in which:

said high tensile strength member holding said end closures in spaced opposed relationship is a high tensile strength minimal stretch band surrounding said casing in the axial direction and passing around each of said end closures, said band being formed by winding a layup of filamentary elements in the desired band configuration bonded together by an adherent matrix material, and a pair of saddles for engaging the respective end closures and having curved surfaces engaging the band in the region where the band passes around each of the end closures.

13. Apparatus for converting heat energy into useful work output as claimed in claim 11, in which:

said means for bringing wax material into heat exchange relationship with said heated liquid in said rigid container for bringing said wax material into heat exchange relationship with said cooled liquid in said rigid container includes means for moving the wax material relative to the heated and cooled liquid in said rigid container.

14. Apparatus for converting heat energy into useful work output as claimed in claim 10, in which:
said means for transferring said heat energy into some of said liquid in said rigid container for providing heated liquid therein includes:
a first heat exchanger into which said heat energy passes, and
first pump means for circulating liquid to be heated out of said rigid container and through said first heat exchanger and back into said rigid container.

15. Apparatus for converting heat energy into useful work output as claimed in claim 10, in which:
said means for transferring heat energy out of other of said liquid in said rigid container for providing cooled liquid therein includes:
a second heat exchanger out of which heat energy passes into a heat sink, and
second pump means for circulating liquid to be cooled out of said rigid container and through said second heat exchanger and back into said rigid container.

16. Apparatus for converting heat energy into useful work output as claimed in claim 10, in which:
said wax material is separated into a plurality of discrete units for providing an augmented surface to volume ratio of said wax material for facilitating the transferring of heat energy into and out of the wax material.

17. Apparatus for converting heat energy into useful work output as claimed in claim 16, in which:
each of said discrete units of the wax material is encased within an expandable envelope for protecting the wax material and for maintaining the shape integrity of the discrete units when the wax material is melted.

18. Apparatus for converting heat energy into useful work output as claimed in claim 10, in which:
said rigid container is oriented with respect to the earth's gravitational field for positioning the heated liquid therein at a higher elevation than the cooled liquid therein for causing the resulting thermo-gravitational effect to aid in reducing the mixing of the heated and cooled liquid.

19. Apparatus for converting heat energy into useful work output as claimed in claim 10, in which:
said heated and said cooled liquid in said rigid container provide a thermal gradient in the liquid in said container,
said wax material is separated into multiple small masses for increasing the surface-to-volume ratio thereof for aiding in the heating and cooling of the wax material,
said means for bringing said wax material into heat exchange relationship with said heated liquid and for bringing said wax material into heat exchange relationship with said cooled liquid includes:
means for relatively moving said multiple small masses of wax material with respect to the thermal gradient in one direction for progressively bringing said multiple small masses of wax material into heat exchange relationship with liquid at progressively higher temperature then for relatively moving said multiple small masses of wax material with respect to the thermal gradient in the opposite direction for progressively bringing said multiple small masses of wax material into heat exchange relationship with liquid at progressively lower temperature, and for causing said relative moving to occur at a moderate rate for allowing significant heat regeneration to occur.

20. Apparatus for converting heat energy into useful work output as claimed in claim 10, in which:
said relatively non-compressible liquid is de-gassed water.

21. Apparatus for converting heat energy into useful work output comprising:
a rigid container having at least one port therein,
a relatively non-compressible liquid in said container,
means for transferring said heat energy into liquid in said container for forming a first zone of heated liquid therein,
means for transferring heat energy from liquid in said container for forming a second zone of cooled liquid therein spaced from said first zone of heated liquid,
a plurality of spaced generally parallel vanes in said container,
each of said vanes including a layer of wax material sandwiched between protective layers,
movable support means for said vanes for moving said vanes edgewise through the liquid in said container into said first zone and then into said second zone and then into said first zone, and so forth, for melting and then resolidifying and then melting the wax material in said vanes and so forth for causing significant volumetric expansion and then contraction and then expansion of said wax material, and so forth,
thereby producing movement of liquid through said port capable of producing useful work.

22. Apparatus for converting heat energy into useful work output as claimed in claim 21, in which:
said vanes are arch shaped as seen in section taken generally perpendicular to their direction of moving edgewise.

23. Apparatus for converting heat energy into useful work output as claimed in claim 21, in which:
said protective layers for the wax material in each vane are formed of aluminum, and
the volumetric expansion and contraction of the aluminum is added to the volumetric expansion and contraction of the wax material.

24. Apparatus for converting heat energy into useful work output as claimed in claim 21, in which:
said means for transferring said heat energy into liquid in said container for forming a first zone of heated liquid therein includes:
a hollow partition in said container having orifices therein communicating with said first zone of heated liquid,
heat exchanger means adapted for being heated by said heat energy, and
pump means connected to said hollow partition and to said heat exchanger means for withdrawing liquid from said rigid container through said hollow partition, for circulating the liquid through said heat exchanger to be heated and for returning the heated liquid through said hollow partition into said first zone.

25. Apparatus for converting heat energy into useful work output as claimed in claim 21, in which:

said means for transferring heat energy from liquid in said container for forming a second zone of cooled liquid therein includes:

a hollow partition in said container having orifices therein communicating with said second zone of cooled liquid, heat exchanger means adapted for being cooled by a heat sink, and pump means connected to said hollow partition and to said heat exchanger means for withdrawing liquid from said rigid container through said hollow partition, for circulating liquid through said heat exchanger to be cooled and for returning the cooled liquid through said hollow partition into said second zone.

26. A system for converting heat energy from a relatively low-temperature heat energy source into useful work output comprising:

at least one rigid container having at least one port therein, a relatively non-compressible liquid in said rigid container, a first heat exchanger adapted for being heated by said low-temperature heat energy source, a second heat exchanger adapted for being cooled by a heat sink, a first pump means communicating with the interior of said rigid container and with said first heat exchanger for circulating liquid from said rigid container through said first heat exchanger and into a first zone in said rigid container for creating a heated zone of liquid therein, second pump means communicating with the interior of said rigid container and with said second heat exchanger for circulating liquid from said rigid container through said second heat exchanger and into a second zone in said rigid container for creating a cooled zone therein, a plurality of units of wax material in said rigid container melting at temperatures below the temperature of said heated zone and resolidifying at temperature above the temperature of said cooled zone, movable support means in said rigid container for moving said units of wax material into said heated zone and then into said cooled zone then into said heated zone, and so forth, for melting and then resolidifying and then melting the wax material, and so forth for causing alternate significant volumetric expansion and contraction of said units of wax material, a low pressure accumulator, a positive-displacement liquid-driven motor having its inlet communicating with the interior of said rigid container and having its outlet communicating with said accumulator, a reservoir of said liquid at ambient pressure, a positive-displacement liquid pump connected to said motor to be driven thereby and having its inlet communicating through a first check valve with said reservoir and having its outlet communicating with said accumulator for pumping liquid from said reservoir into said accumulator through said first check valve, said pump having a relatively great mechanical advantage with respect to said motor for enabling a relatively low pressure in said accumulator at the outlet of said pump to balance against a relatively great pressure at the inlet of said motor, said system including a first liquid flow path having a second check valve therein and extending between said accumulator and said rigid container for feeding make-up liquid through said second check valve into said rigid container whenever the pressure in said container falls below the pressure in said accumulator, said system including a second liquid flow path including a shut-off valve for allowing liquid to return from said accumulator to said reservoir, and means communicating with said port in said rigid container for using the flow of liquid for producing useful work output.

27. A system for converting heat energy from a relatively low temperature heat energy source into useful work output as claimed in claim 26, in which:

said second liquid flow path includes liquid-driven drive means connected to said movable support means for moving said units of wax material in said rigid container.

28. A system for converting heat energy from a relatively low temperature heat energy source into useful work output as claimed in claim 27, in which:

said shut-off valve in said second liquid flow path is coupled to said heat energy source for automatically turning on said system whenever the temperature of said source is appropriate for system operation.

29. A system for converting heat energy from a relatively low temperature heat energy source into useful work output as claimed in claim 27, in which:

said second liquid flow path includes liquid flow control means for controlling the speed of said liquid-driven drive means for controlling the speed of movement of said units of wax material in said rigid container.

30. A system for converting heat energy from a relatively low temperature heat energy source into useful work output as claimed in claim 27, in which:

said second liquid flow path includes liquid-driven motor means connected to said first and second pump means for driving said first and second pump means for circulating liquid.

31. Apparatus for converting heat energy from a relatively low temperature heat source into useful work output comprising:

a wax material having a relatively great volumetric thermal expansion and contraction within a predetermined temperature range below the temperature of said relatively low temperature heat source, said wax material being separated into a plurality of discrete units for providing an augmented surface-to-volume ratio for said wax material for facilitating the transferring of heat energy into and out of said discrete units, each of said discrete units of said wax material being encased in a thin layer of compatible material for containing and supporting said discrete units during heating and cooling thereof, a heat-transfer liquid surrounding said encased discrete units of said wax material, means for transferring heat energy from said heat source into said heat-transfer liquid for heating a zone thereof for providing a heated zone, a heat sink at a temperature below said predetermined range, means for transferring heat energy from said heat-transfer liquid into said heat source for cooling a zone thereof spaced from said heated zone for providing a cooled zone spaced from said heated zone, means for cyclically causing said encased units of said wax material to be positioned in said heated zone for heating said wax material for causing volumetric expansion thereof and for causing said encased units of said wax material to be positioned in said cooled zone for cooling said wax material for causing volumetric contraction thereof, and means for using the resulting significant volumetric increase and volumetric decrease of the expanding and contracting wax material for performing useful work output.

32. Apparatus for converting heat energy from a relatively low temperature heat source into useful work output as claimed in claim 31, including:

means for establishing a base pressure, and means for applying said base pressure to said wax material during said expanding and contracting thereof.

33. The method of converting heat energy into useful work output comprising the steps of:

providing a rigid container having a port therein, using said heat energy for heating liquid, providing a heat sink, using said heat sink for cooling liquid, providing multiple small masses of wax material, enclosing each of said small masses of wax material within an envelope of protective material having a high heat conductivity, bringing said multiple small masses of wax material into heat exchange relationship with heated liquid in said rigid container for heating said wax material for producing volumetric expansion of said wax material for driving liquid out of said rigid container through said port, then bringing said multiple small masses of wax material into heat exchange relationship with cooled liquid in said container for cooling said wax material for producing volumetric contraction of said wax material for allowing liquid to return into said container, said protective material being aluminum and the significant volumetric expansion and contraction of the aluminum during heating and cooling thereof being added to that of the wax material, repeating said steps of bringing said multiple small masses of wax material into heat exchange relationship with heated liquid in said rigid container and then bringing said multiple small masses of wax material into heat exchange relationship with cooled liquid in said container, and using the resulting flow of liquid for producing useful work.

34. The method of converting heat energy into useful work output as claimed in claim 33, in which:

each of said multiple small masses of wax material has a thin wide area configuration and the protective aluminum envelope therefor includes two thin layers of aluminum sandwiching the thin wide area of wax material between them forming a vane, and including the steps of:

cyclically relatively moving each of the vanes edgewise back and forth with respect to liquid within said rigid container for alternately bringing them into heat exchange relationship with heated and then with cooled liquid in said rigid container.

35. The method of converting heat energy into useful work output comprising the steps of:

providing a rigid container having a port therein, using said heat energy for heating liquid, providing a heat sink, using said heat sink for cooling liquid, establishing a thermal gradient in liquid in said rigid container between heated liquid and cooled liquid, providing multiple small masses of wax material, preselecting at least a first wax material and a second wax material, said first wax material melting and resolidifying at a higher transition temperature range than said second wax material, forming a first portion of said multiple small masses of wax material from said first wax material, forming a second portion of said multiple small masses of wax material from said second wax material, and orienting said multiple small masses of wax material with respect to said thermal graident for positioning the first portion thereof in a higher temperature region along said thermal gradient than said second portion of said multiple small masses, relatively moving said multiple small masses of wax material with respect to the thermal gradient in one direction for progressively bringing said multiple small masses of wax material into heat exchange relationship with liquid at progressively higher temperature for heating said wax material for producing volumetric expansion of said wax material for driving liquid out of said rigid container, then relatively moving said multiple small masses of wax material with respect to the thermal gradient in the opposite direction for progressively bringing said multiple small masses of wax material into heat exchange relationship with liquid at progressively lower temperature for cooling said wax material for producing volumetric contraction of said wax material for allowing liquid to return through said port into said container, causing said relative moving to occur at a moderate rate for allowing significant heat regeneration to occur, repeating said steps of relatively moving said multiple small masses of wax material with respect to said thermal gradient, and using the resulting flow of liquid for producing useful work.

36. The method of converting heat energy into useful work output compising the steps of:

providing a rigid container having a port therein, providing liquid in said container, using said heat energy for heating a first zone of liquid in said rigid container, providing a heat sink, using said heat sink for cooling a second zone of liquid in said rigid container, providing multiple small masses of wax material, cyclically moving said multiple small masses of wax material from said first zone to said second zone and then from said second zone to said first zone, and so on, for alternately bringing said multiple small masses of wax material into heat exchange relationship with the heated liquid in said first zone for producing volumetric expansion of said wax material for driving liquid out of said rigid container through said port and for then bringing said multiple small masses of wax material into heat exchange relationship with the cooled liquid in said second zone for producing volumetric contraction of said wax material for allowing liquid to return into said container, making the liquid in said rigid container thixotropic for reducing turbulent circulation of the liquid caused by moving said multiple small masses of wax material for reducing the mixing of heated and cooled liquid in said rigid container, and using the resulting flow of liquid for producing useful work.

37. The method of converting heat energy from a relatively low temperature heat source into useful work output comprising the steps of:

providing wax material capable of melting and resolidifying at a temperature range below the temperature of said relatively low temperature heat source, separating said wax material into multiple discrete units for providing an augmented surface to volume ratio for facilitating the transferring of heat energy into and out of the wax material, providing a heat sink at a temperature below the temperature range at which said wax material melts and resolidifies, placing said wax material in a rigid container having at least one port therein, transferring heat energy from said relatively low temperature heat source into said wax material for heating said wax material in said rigid container for melting said wax material for causing volumetric increases of the wax material for increasing the pressure within said container, then transferring heat energy out of said melted wax material into said heat sink for cooling said wax material in said rigid container for resolidifying said wax material for causing volumetric decrease of the wax material for reducing the pressure within said container, repeating said steps of transferring heat energy into said wax material and then transferring heat energy out of said wax material, encasing each of said discrete units of the wax material within an expandable envelope for protecting the wax material and for maintaining the shape integrity of the discrete units when the wax material is melted, said expandable envelopes for said discrete units being formed of aluminum for providing good heat conductivity into and out of the discrete units of wax material, using the volumetric expansion and contraction of the aluminum in addition to the volumetric increase and decrease of the wax material, and using the resulting increase and decrease of pressure within said rigid container for producing useful work output.

38. The method of converting heat energy from a relatively low temperature heat source into useful work output comprising the steps of:

providing wax material capable of melting and resolidifying at a temperature range below the temperature of said relatively low temperature heat source, providing a heat sink at a temperature below the temperature range at which said wax material melts and resolidifies, placing said wax material in a rigid container having at least one port therein, transferring heat energy from said relatively low temperature heat source into said wax material for heating said wax material in said rigid container for melting said wax material for causing volumetric increase of the wax material for increasing the pressure within said container, then transferring heat energy out of said melted wax material into said heat sink for cooling said wax material in said rigid container for resolidifying said wax material for causing volumetric decrease of the wax material for reducing the pressure within said container, repeating said steps of transferring heat energy into said wax material and then transferring heat energy out of said wax material, placing relatively non-compressible liquid in said rigid container with said wax material for causing liquid to be forced out of said container through said port during each volumetric increase of the wax material, circulating said relatively non-compressible liquid as a heat transfer medium for transferring heat energy from said relatively low temperature heat source, also circulating said relatively non-compressible liquid as a heat transfer medium for transferring heat energy into said heat sink, and using the resulting increase and decrease of pressure within said rigid container causing movement of the liquid for producing useful work output.

39. Apparatus for converting heat energy into useful work output comprising:

a rigid container having at least one port therein, a relatively non-compressible liquid, means for transferring said heat energy into some of said liquid in said rigid container for providing heated liquid therein, means for transferring heat energy out of other of said liquid in said rigid container for providing cooled liquid therein, wax material melting at a temperature below the temperature of said heat energy, means for bringing said wax material into heat exchange relationship with said heated liquid in said rigid container for heating and melting the wax material for producing volumetric expansion of the wax material and for bringing said wax material into heat exchange relationship with said cooled liquid in said rigid container for cooling and resolidifying the wax material for producing volumetric contraction of the wax material and for repeating alternately said bringing of said wax material into heat exchange relationship with said heated liquid and with said cooled liquid, said wax material being separated into a plurality of discrete units for providing an augmented surface to volume ratio of said wax material for facilitating the transferring of heat energy into and out of the wax material, each of said discrete units of the wax material being encased within an expandable envelopes for protecting the wax material and for maintaining the shape integrity of the discrete units when the wax material is melted, said expandable envelope for said discrete units being formed of aluminum for providing good heat conductivity into and out of the discrete units of wax material, and the volumetric expansion and contraction of the aluminum acting in addition to the volumetric increase and decrease of the wax material for causing flow of the liquid through said port for producing useful work.

40. Apparatus for converting heat energy into useful work output comprising:

a rigid container having at least one port therein, a relatively non-compressible liquid, means for transferring said heat energy into some of said liquid in said rigid container for providing heated liquid therein, means for transferring heat energy out of other of said liquid in said rigid container for providing cooled liquid therein, wax material melting at a temperature below the temperature of said heat energy, means for bringing said wax material into heat exchange relationship with said heated liquid in said rigid container for heating and melting the wax material for producing volumetric expansion of the wax material and for bringing said wax material into heat exchange relationship with said cooled liquid in said rigid container for cooling and resolidifying the wax material for producing volumetric contraction of the wax material and for repeating alternately said bringing of said wax material into heat exchange relationship with said heated liquid and with said cooled liquid, thereby causing flow of the liquid through said port for producing useful work, said rigid container having a circular cylindrical configuration including a cylindrical casing and a pair of spaced end closures in opposed relationship for closing opposite ends of said casing, said cylindrical casing including concentrically arranged high tensile strength filamentary elements bonded together by an adherent matrix material, at least one high tensile strength member holding said end closures in spaced opposed relationship, said means for bringing wax material into heat exchange relationship with said heated liquid in said rigid container and for bringing said wax material into heat exchange relationship with said cooled liquid in said rigid container including means for moving the wax material relative to the heated and cooled liquid in said rigid container, said wax material being divided into a multiplicity of thin vane-shaped masses, two thin layers of material of good heat conductivity sandwiching each of said vane-shaped masses of wax material for protecting the wax material and for forming a vane for maintaining the shape integrity of the wax material when melted, and said means for moving the wax material relative to the heated and cooled liquid in said rigid container includes reciprocating drive means for moving said vanes edgewise through the liquid in said rigid container.

41. Apparatus for converting heat energy into useful work output as claimed in claim 38, in which:

said vanes are positioned in spaced parallel relationship and are arranged in at least first and second movable vane assemblies in said rigid container, and said reciprocating drive means includes first and second shafts rotatable in opposite directions, said first and second shafts being connected to said first and second vane assemblies respectively for swinging them back and forth within said rigid container with a butterfly-like motion.

42. Apparatus for converting heat energy into useful work output as claimed in claim 40, in which:

said relatively non-compressible liquid is thixotropic for reducing the mixing of the heated and cooled liquid.

43. Apparatus for converting heat energy into useful work output comprising:

a rigid container having at least one port therein, a relatively non-compressible liquid, means for transferring said heat energy into some of said liquid in said rigid container for providing heated liquid therein, means for transferring heat energy out of other of said liquid in said rigid container for providing cooled liquid therein, wax material melting at a temperature below the temperature of said heat energy, said wax material being separated into multiple small masses for increasing the surface-to-volume ratio thereof for aiding in the heating and cooling of the wax material, means for bringing said wax material into heat exchange relationship with said heated liquid in said rigid container for heating and melting the wax material for producing volumetric expansion of the wax material and for bringing said wax material into heat exchange relationship with said cooled liquid in said rigid container for cooling and resolidifying the wax material for producing volumetric contraction of the wax material and for repeating alternately said bringing of said wax material into heat exchange relationship with said heated liquid and with said cooled liquid, thereby causing flow of the liquid through said port for producing useful work, said heated and said cooled liquid in said rigid container providing a thermal gradient in the liquid in said container, said means for bringing said wax material into heat exchange relationship with said heated liquid and for bringing said wax material into heat exchange relationship with said cooled liquid including:

means for relatively moving said multiple small masses of wax material with respect to the thermal gradient in one direction for progressively bringing said multiple small masses of wax material into heat exchange relationship with liquid at progressively higher temperature then for relatively moving said multiple small masses of wax material with respect to the thermal gradient in the opposite direction for progressively bringing said multiple small masses of wax material into heat exchange relationship with liquid at progressively lower temperature, and for causing said relative moving to occur at a moderate rate for allowing significant heat regeneration to occur, said wax material in each of said multiple small masses including at least a first wax material and a second wax material, said first wax material melting and resolidifying at a higher transition temperature range than said second wax material, a first portion of each of said multiple small masses of wax material being formed from said first wax material, a second portion of each of said multiple small masses of wax material being formed from said second wax material, and said multiple small masses of wax material each being oriented with respect to said thermal gradient for positioning the first portion thereof in a higher temperature region along said thermal gradient than said second portion thereof.

44. The method of converting heat energy from a relatively low temperature heat source into useful work output comprising the steps of:

providing wax material capable of relatively great volumetric thermal expansion and contraction within a predetermined temperature range below the temperature of said relatively low temperature heat source, configuring said wax material for providing a relatively great surface-to-volume ratio for facilitating transfer of heat energy into and out of said wax material, providing a heat sink at a temperature below said temperature range, placing said wax material in container means which resists expansion when subjected to relatively high values of internal pressure, providing outlet means in said container means, circulating liquid in heat exchange relationship with said relatively low temperature heat source and bringing the resultant heated liquid into heat exchange relationship with said wax material for transferring heat energy from said relatively low temperature heat source into said wax material for heating said wax material for expanding said wax material for causing relatively great volumetric increase of the wax material, then bringing said liquid at a lower temperature than said expanded wax material into heat exchange relationship with said expanded wax material and into heat exchange relationship with said heat source for transferring heat energy out of said wax material into said heat sink for cooling said wax material for contracting said wax material for causing relatively great volumetric decrease of wax material, repeating said steps of bringing the heated liquid into heat exchange relationship with the wax material for transferring heat energy into said wax material and then bringing the liquid at a lower temperature than the wax material into heat exchange with the expanded wax material for transferring heat energy out of said wax material, and using the resulting significant volumetric increase and significant volumetric decrease of the expanding and contracting wax material for displacing relatively incompressible liquid out of and into said container means for producing useful work output.

45. The method of converting heat energy from a relatively low temperature heat source into useful work output comprising the steps of:

providing a container, providing a heat exchange liquid in said container, transferring heat energy from said relatively low temperature heat source into the liquid in the upper portion of said container for establishing a heated zone therein, cooling the liquid in the lower portion of said container for establishing a cooled zone therein and for establishing a thermal gradient in the liquid in said container between said heated and cooled zones, said upper and lower portions being relative to the earth's gravitational field, allowing the resulting thermogravitational effect to aid in avoiding intermixing of the liquid in said heated and cooled zones, providing wax material having a relatively great volumetric thermal expansion and contraction within a predetermined temperature range below the temperature of said relatively low temperature heat source, configuring said wax material for providing a relatively great surface-to-volume ratio thereof for facilitating transfer of heat energy into and out of said wax material, relatively cyclically moving said wax material and the liquid in said container for alternately causing said wax material to be in heat exchange relationship with the liquid in said heated and cooled zones, respectively, and using the resulting significant volumetric increase and significant volumetric decrease of the expanding and contracting wax material for producing useful work output, and thereby providing a heat regenerative effect by heat exchange between the cyclically relatively moving wax material and said liquid having said thermal gradient therein.

46. The method of converting heat energy from a relatively low temperature heat source into useful work output as claimed in claim 45, including the steps of:

establishing a base pressure, and applying said base pressure to the wax material during said expanding and contracting thereof.

47. The method of converting heat energy from a relatively low temperature heat source into useful work as claimed in claim 45, including the further step of:

providing a thixotropic agent in said heat exchange liquid for inhibiting intermixing between the liquid in the heated zone in the upper portion of said container and the liquid in the cooled zone in the lower portion of said container.

48. The method of converting heat energy from a relatively low temperature heat source into useful work as claimed in claim 45, including the step of:

configuring said wax material for providing a relatively great surface-to-volume ratio for facilitating transfer of heat energy into and out of said wax material by separating the wax material into multiple individual elements.

49. The method of converting heat energy from a relatively low temperature heat source into useful work output as claimed in claim 48, including the further step of:

surrounding each of said multiple individual elements of wax material by a protective layer of material compatible with the wax material, said protective layers having mechanical strength for supporting and confining the individual elements of wax material as they are alternately heated and cooled.

50. The method of converting heat energy from a relatively low temperature heat source into useful work as claimed in claim 45, including the further step of:
providing a thixotropic condition in said heat exchange liquid for inhibiting intermixing between the liquid in the heated zone in the upper portion of said container and the liquid in the cooled zone in the lower portion of said container.

51. Apparatus for converting heat energy from a relatively low temperature heat source into useful work output comprising:
wax material capable of relatively great volumetric thermal expansion and contraction within a predetermined temperature range below the temperature of said relatively low temperature heat source,
said wax material being configured for providing a relatively great surface-to-volume ratio for facilitating transfer of heat energy into and out of said wax material,
container means surrounding said wax material,
said container means resisting expansion when subject to relatively high values of internal pressure,
said container means having outlet means,
a heat sink at a temperature below said temperature range,
means for circulating liquid into heat exchange relationship with said low temperature heat source for heating the liquid and for bringing the heated liquid into heat exchange relationship with said configured wax material for transferring heat energy from said relatively low temperature heat source into said configured wax material for heating said wax material for expanding said wax material for causing relatively great volumetric increase of the configured wax material,
means for bringing liquid at a lower temperature than the expanded configured wax material into heat exchange with said wax material and then circulating such liquid into heat exchange relationship with the heat sink for transferring heat energy out of said configured wax material into said heat sink for cooling said wax material for contracting said wax material for causing relatively great volumetric decrease of the wax material, and
means for using the resulting significant volumetric increase and significant volumetric decrease of the expanding and contracting configured wax material for producing useful work output.

52. Apparatus for converting heat energy from a relatively low temperature heat source into useful work output comprising:
a container,
a heat exchange liquid in said container,
means for transferring heat energy from said relatively low temperature heat source into the liquid in the upper portion of said container for establishing a heated zone therein,
means for cooling the liquid in the lower portion of said container for establishing a cooled zone therein and for establishing a thermal gradient in the liquid in said container between said heated and cooled zones,
said upper and lower portions being relative to the earth's gravitational field,
the resulting thermogravitational effect between the relatively lighter heated liquid in the upper portion of said container and the relatively heavier cooled liquid in the lower portion of said container aiding in avoiding intermixing of the liquid in said heated and cooled zones,
wax material within said container and having a relatively great volumetric thermal expansion and contraction within a predetermined temperature range below the temperature of said relatively low temperature heat source,
said wax material being configured for providing a relatively great surface-to-volume ratio thereof for facilitating transfer of heat energy into and out of said wax material,
means for relatively cyclically moving said wax material and the liquid in said container for alternately causing said wax material to be in heat exchange relationship with the liquid in said heated and cooled zones, respectively,
for causing resulting significant volumetric increase and significant volumetric decrease of the expanding and contracting wax material for producing useful work output, and
thereby providing a heat regenerative effect by heat exchange between the cyclically relatively moving wax material and said liquid having said thermal gradient therein.

53. Apparatus for converting heat energy from a relatively low temperature heat source into useful work output, as claimed in claim 52, in which:
said heat exchange liquid in said container is thixotropic for inhibiting intermixing between the liquid in said heated and cooled zones.

54. The method of converting heat energy from a relatively low temperature heat source into useful work output comprising the steps of:
providing wax material capable of melting and resolidifying at a temperature range below the temperature of said relatively low temperature heat source,
providing a heat sink at a temperature below the temperature range at which said wax material melts and resolidifies,
placing said wax material in a rigid container which resists expansion when subjected to a relatively high internal pressure and having at least one port therein,
placing a relatively incompressible liquid in said rigid container,
circulating said relatively non-compressible liquid as a heat transfer medium for transferring heat energy from said relatively low temperature heat source into said wax material for heating said wax material in said rigid container for melting said wax material for causing volumetric increase of the wax material for increasing the pressure within said container,
also circulating said relatively non-compressible liquid as a heat transfer medium for transferring heat energy out of said melted wax material into said heat sink for cooling said wax material in said rigid container for resolidifying said wax material for causing volumetric decrease of the wax material for reducing the pressure within said container,
repeating said steps of transferring heat energy into said wax material and then transferring heat energy out of said wax material,
using the resulting increase and decrease of pressure within said rigid container for driving said relatively incompressible liquid out of and into said rigid container for producing useful work output.

* * * * *